United States Patent
John

(10) Patent No.: US 9,593,941 B2
(45) Date of Patent: Mar. 14, 2017

(54) CLEARANCE DETECTION SYSTEM AND METHOD USING FREQUENCY IDENTIFICATION

(71) Applicant: Hood Technology Corporation, Hood River, OR (US)

(72) Inventor: Shaju John, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 18 days.

(21) Appl. No.: 14/831,509

(22) Filed: Aug. 20, 2015

(65) Prior Publication Data

US 2016/0084637 A1 Mar. 24, 2016

Related U.S. Application Data

(60) Provisional application No. 62/054,646, filed on Sep. 24, 2014.

(51) Int. Cl.
*G01B 11/14* (2006.01)
*F01D 11/14* (2006.01)
*F01D 21/00* (2006.01)

(52) U.S. Cl.
CPC ............. *G01B 11/14* (2013.01); *F01D 11/14* (2013.01); *F01D 21/003* (2013.01); *F05D 2270/804* (2013.01)

(58) Field of Classification Search
CPC ....... G01B 11/14; F01D 11/14; F01D 21/003; F05D 2270/804

(Continued)

(56) References Cited

U.S. PATENT DOCUMENTS 3,065,412 A 11/1962 Rosenthal
3,652,195 A 3/1972 McIntosh et al.
(Continued)

FOREIGN PATENT DOCUMENTS

JP 8-75768 3/1996
WO WO 2010/017893 2/2010
WO WO 2012/097284 7/2012

OTHER PUBLICATIONS

Dhadwal, H.S. et al., "Time-of-Flight Tip-Clearance Measurements," National Aeronautics and Space Administration Glenn Research Center, May 1999 (10 pages).
(Continued)

*Primary Examiner* — Seung C Sohn
(74) *Attorney, Agent, or Firm* — Neal, Gerber & Eisenberg LLP

(57) ABSTRACT

Various embodiments of the present disclosure provide a clearance detection system and method using frequency identification. Generally, the clearance detection system of the present disclosure uses a fiber optic sensor to determine a distance between a target traversing through a target area and a wall of a housing or casing within which the target is rotating. In various embodiments, the clearance detection system does so by projecting a light field including multiple alternating and diverging illuminated and non-illuminated regions into the target area, collecting light reflected off of the target as the target traverses through the light field, generating an oscillatory signal based on the collected reflected light, identifying the dominant frequency of the signal, and using the dominant frequency to determine the distance.

20 Claims, 4 Drawing Sheets

(58) Field of Classification Search
USPC .......................................... 250/559.38, 206
See application file for complete search history.

(56) References Cited

U.S. PATENT DOCUMENTS

| | | | |
|---|---|---|---|
| 3,932,813 A | 1/1976 | Gallant | |
| 4,049,349 A | 9/1977 | Wennerstrom | |
| 4,070,883 A | 1/1978 | Kunz et al. | |
| 4,357,104 A * | 11/1982 | Davinson | G01B 11/14 250/559.38 |
| 4,439,728 A | 3/1984 | Rickman, Jr. | |
| 4,596,460 A * | 6/1986 | Davinson | G01B 11/14 250/559.38 |
| 4,678,992 A | 7/1987 | Hametta | |
| 4,841,243 A | 6/1989 | Bishop et al. | |
| 4,847,556 A | 7/1989 | Langley | |
| 4,956,606 A | 9/1990 | Kwiatkowski et al. | |
| 4,967,153 A | 10/1990 | Langley | |
| 5,015,949 A | 5/1991 | Koch et al. | |
| 5,017,796 A * | 5/1991 | Makita | G01B 11/14 250/201.4 |
| 5,046,468 A | 9/1991 | Erhard | |
| 5,097,711 A | 3/1992 | Rozelle et al. | |
| 5,373,234 A | 12/1994 | Kulczyk | |
| 5,381,090 A | 1/1995 | Adler et al. | |
| 5,767,402 A | 6/1998 | Sandlass et al. | |
| 5,942,893 A | 8/1999 | Terpay | |
| 6,125,706 A | 10/2000 | Buttram et al. | |
| 6,140,727 A | 10/2000 | Goto et al. | |
| 6,170,148 B1 | 1/2001 | Van Den Berg | |
| 6,384,595 B1 | 5/2002 | Ito et al. | |
| 6,409,465 B1 | 6/2002 | von Flotow et al. | |
| 6,422,813 B1 | 7/2002 | Mercadal et al. | |
| 6,607,359 B2 | 8/2003 | von Flotow | |
| 6,785,635 B2 | 8/2004 | von Flotow | |
| 6,927,567 B1 | 8/2005 | Roeseler et al. | |
| 7,027,166 B2 * | 4/2006 | Luetche | G01S 17/58 356/615 |
| 7,170,284 B2 | 1/2007 | Roeseler et al. | |
| 7,333,912 B2 | 2/2008 | Iida et al. | |
| 7,400,418 B2 | 7/2008 | Haffner et al. | |
| 8,009,939 B2 | 8/2011 | Zheng et al. | |
| 8,164,761 B2 | 4/2012 | Kominsky | |
| 8,624,604 B2 | 1/2014 | Heyworth et al. | |
| 2002/0180426 A1 | 12/2002 | Schroeder et al. | |
| 2003/0096673 A1 | 5/2003 | Ezure et al. | |
| 2005/0280412 A1 | 12/2005 | Roeseler et al. | |

OTHER PUBLICATIONS

Skewed Dual Light Probe—SDLP, Hood Technology, Nov. 24, 2009 (3 pages).

Tappert et al., Monitoring blade passage in turbomachinery through the engine case (no holes), Aerospace Conference Proceedings, 2002 IEEE, vol. 6, Iss., 2002, pp. 6-3125-6-3129.

* cited by examiner

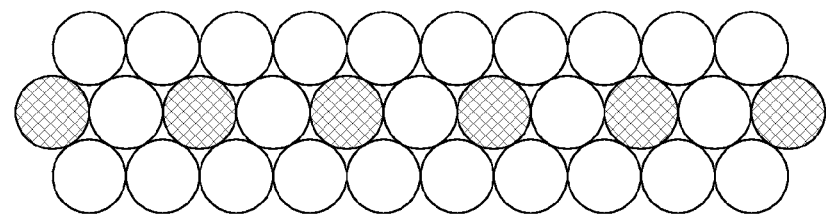
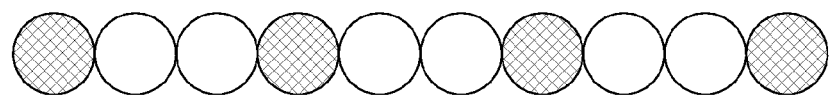
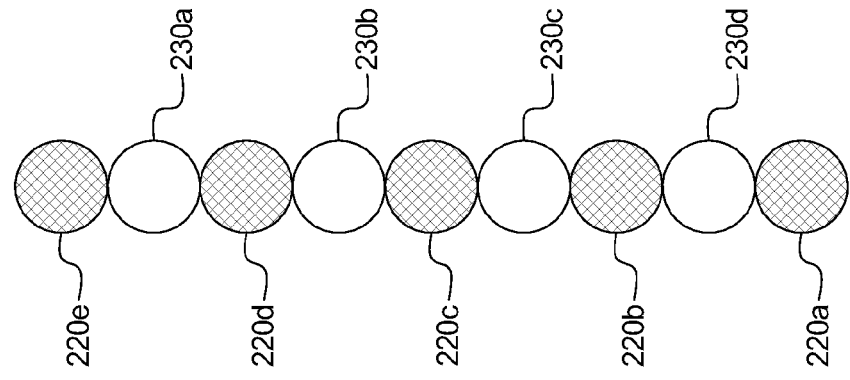
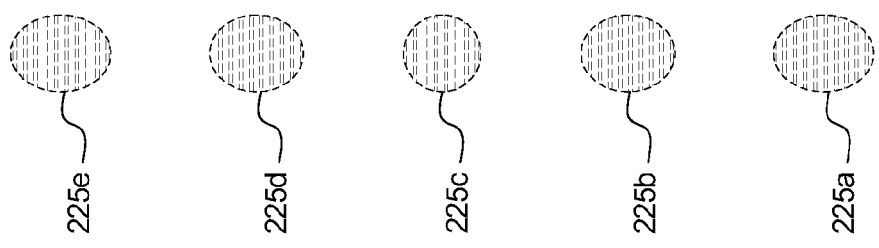

CLEARANCE DETECTION SYSTEM AND METHOD USING FREQUENCY IDENTIFICATION

This application claims priority to and the benefit of U.S. Provisional Patent Application Ser. No. 62/054,646, filed on Sep. 24, 2014, the entire contents of which are incorporated herein by reference.

BACKGROUND

Turbines, such as those used in gas turbine engines, generally include a casing or shroud that houses a rotor configured to rotate therein. The rotor includes a hub and a plurality of circumferentially-spaced rotor blades extending outward from the hub. The components of the rotor are positioned, configured, and sized such that a relatively small gap or clearance exists between the tips of the rotor blades and the interior surface of the casing. The size of the clearance is directly related to the efficiency at which the turbine operates. During operation, however, the size of the clearance may vary due to a number of factors, such as the expansion and/or contraction of the components of the turbine due to temperature fluctuations, movement of the components of the turbine, and/or degradation of the tips of the rotor blades and/or the interior surface of the casing.

Since the size of the clearance between the tips of the rotor blades and the interior surface of the casing directly affects the efficiency of the turbine, and since the size of the clearance may vary during operation of the turbine and thus vary the efficiency of the turbine, it is desirable to monitor the size of the clearance to ensure optimal turbine operation. There are a variety of known clearance detection systems configured to determine the size of the clearance.

One known clearance detection system is described in U.S. Pat. No. 4,049,349. This known clearance detection system includes a skewed arrangement of optical fibers connected to a remote light-source and a light detector. The skewed arrangement of the optical fibers generates two diverging light beams. This known clearance detection system measures the time-delay between a target reflecting light from the first and the second light beams. The time-of-flight between the two beams is calibrated to the clearance between the target and the sensor head.

Another known clearance detection system is described in "Time-Of-Flight Tip-Clearance Measurements," authored by H. S. Dhawal, A. P. Kurkov, and D. C. Janetzke and published in the 35th AIAA/ASME/SAE/ASEE Joint Propulsion Conference and Exhibit, Jun. 20-24, 1999. This known clearance detection system includes a time of flight probe that incorporates two separate optical probes into a sensor head. The two probes are tilted equally with respect to the axis of the sensor head. The signal generated by a target that traverses across the skewed light beams is timed to extract the time of flight between the two beams. The measured time of flight is calibrated to the clearance between a target and the sensor.

Another known clearance detection system is described in U.S. Pat. No. 8,009,939. This known clearance detection system includes a plurality of optical fibers that project light of different wavelengths at a target. This known clearance detection system exploits the relative amplitudes of the wavelengths of the reflected light to calculate the clearance between the target and the sensor face.

Another known clearance detection system is described in U.S. Pat. No. 7,400,418. This known clearance detection system relies on the detection of the power spectrum due to interference between a beam of light reflected from a target and a reference beam into which a deliberate delay was introduced using an acousto-optical module. The interference pattern produced by the two beams depends on the clearance between the moving target and the collimator and the delay introduced into the reference beam by the frequency modulated acousto-optical module. In this clearance detection system, the intensity of the reflected light has to be matched with the delayed reference beam through an attenuator.

Another known clearance detection system is described in U.S. Pat. No. 8,624,604. This known clearance detection system includes a main waveguide and a reference element that is provided at a position intermediate the proximal and distal ends, or at the distal end, of the waveguide. The transmitter/receiver is arranged to transmit an electromagnetic signal through the main waveguide and receive a reflection of the transmitted electromagnetic signal from the reference element, the casing surface, and from a target, enabling the relative positioning of the reference element, the casing surface, and the target to be simultaneously determined.

Another known clearance detection system is described in U.S. Pat. No. 7,333,912. This known clearance detection system includes a reference geometry disposed on a first object having an otherwise continuous surface geometry and a sensor disposed on a second object, wherein the sensor is configured to generate a first signal representative of a first sensed parameter from the first object and a second signal representative of a second sensed parameter from the reference geometry. This known clearance detection system also includes a processing unit configured to process the first and second signals to estimate a clearance between the first and second objects based upon a measurement difference between the first and second sensed parameters.

Another known clearance detection system is described in U.S. Pat. No. 8,164,761. This known clearance detection system uses a reference beam and a signal beam that have different focal lengths or that diverge/converge at different rates. The beams are fixed to the stationary member and proximate to each other. The beams are projected across a clearance between the stationary member and a target toward the target. The reference and signal beams are reflected by the target when the target intersects the reference and signal beam, and the reflected reference and signal pulses are obtained. One or more features of the reflected reference pulse and the reflected signal pulse, such as a rise time of the pulses, a fall time of the pulses, a width of the pulses, and a delay between the reflected reference pulse and the reflected signal pulse (among other factors) are obtained. The width of the clearance is obtained using at least one of these factors.

There is a continuing need for new and improved clearance detection systems and methods for determining the clearance between the blade tip and the casing.

SUMMARY

Various embodiments of the present disclosure provide a clearance detection system and method using frequency identification. Generally, the clearance detection system of the present disclosure uses a fiber optic sensor to determine a distance between a target traversing through a target area and a wall of a housing or casing within which the target is rotating. The fiber optic sensor is mounted to and supported by the wall of the housing. For instance, in an example embodiment in which a turbine rotor including a plurality of turbine blades is rotating within a casing, the clearance detection system uses a fiber optic sensor mounted to and supported by a wall of the casing to determine the distance between a tip of one of the rotor blades of the turbine rotor and the wall of the casing. In various embodiments, the clearance detection system does so by projecting a light field including multiple alternating and diverging illuminated and non-illuminated regions into the target area, collecting light reflected off of the target as the target traverses through the light field, generating an oscillatory signal based on the collected reflected light, identifying the dominant frequency of the signal, and using the dominant frequency to determine the distance.

Additional features and advantages are described herein, and will be apparent from the following Detailed Description and the Figures.

BRIEF DESCRIPTION OF THE FIGURES

FIG. 2 is a cross-sectional view of the light field projected by the clearance detection system of FIG. 1 taken substantially along line 2-2 of FIG. 1.

FIG. 3A is a cross-sectional view of the send and receive fibers of the clearance detection system of FIG. 1 taken substantially along line 3A-3A of FIG. 1.

FIG. 3B is a cross-sectional view of a configuration of send and receive fibers of another embodiment of the clearance detection system.

FIG. 3C is a cross-sectional view of a configuration of send and receive fibers of another embodiment of the clearance detection system.

DETAILED DESCRIPTION

Components

Figure 1:
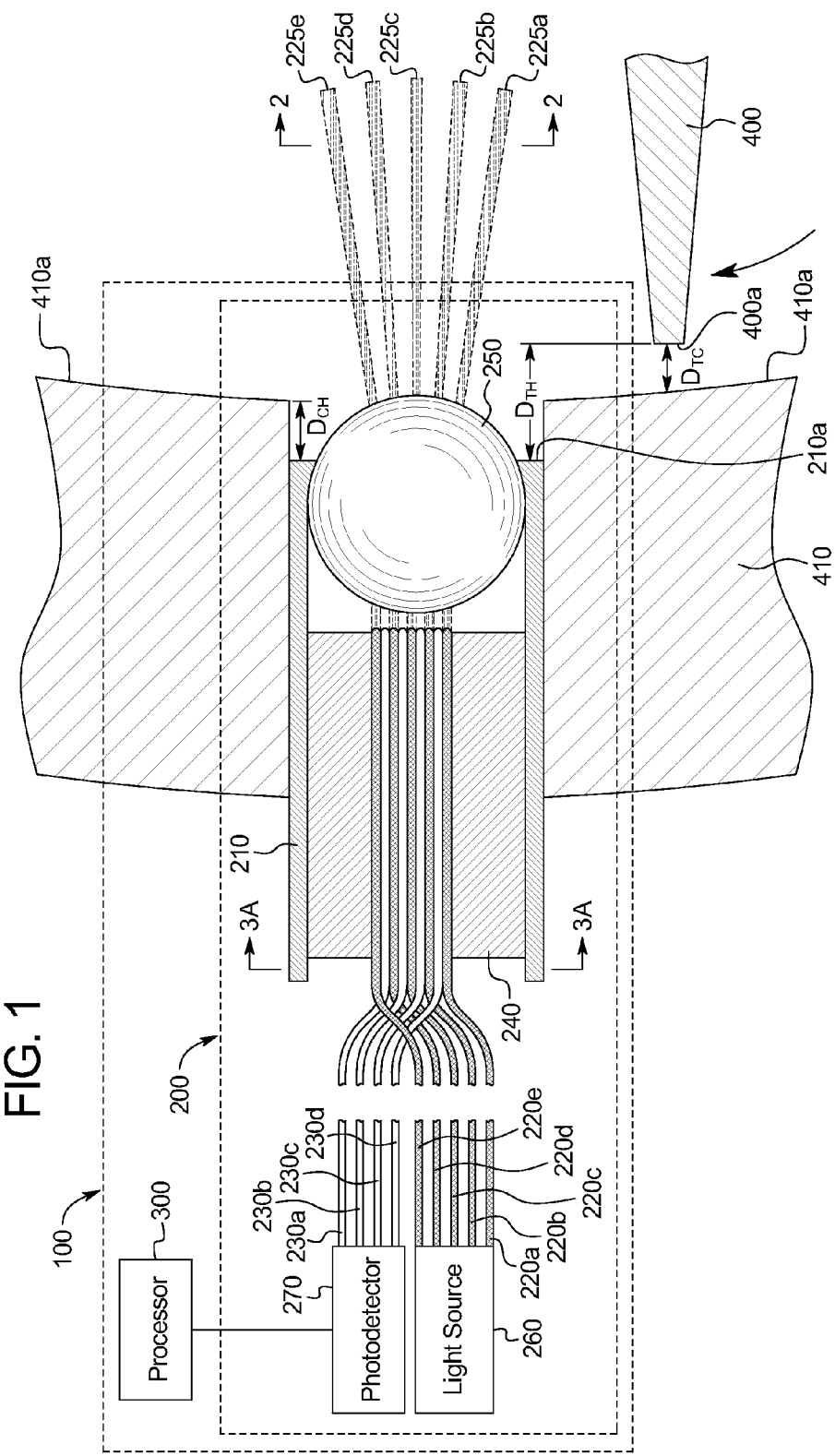
FIG. 1 is a partial cutaway view of one example embodiment of the clearance detection system of the present disclosure.

Referring now to the drawings, FIGS. 1, 2, and 3A illustrate one example embodiment of the clearance detection system of the present disclosure, which is generally indicated by numeral 100. In this example embodiment, the clearance detection system 100 includes a fiber optic sensor 200 and a processor 300.

The fiber optic sensor 200 includes a housing 210; a plurality of optical send fibers 220a, 220b, 220c, 220d, and 220e each configured to transmit light and each including a first end (not labeled) and an opposing second end (not labeled); a plurality of optical receive fibers 230a, 230b, 230c, and 230d each configured to transmit light and each including a first end (not labeled) and an opposing second end (not labeled); a fiber holder 240; a collimator 250; a light source 260; and a photodetector 270.

The fiber holder 240 is disposed within the housing 210 and is configured to hold portions of the send fibers 220 and portions of the receive fibers 230 in a particular arrangement relative to one another. In this example embodiment, the fiber holder 240 holds a portion of each send fiber 220 extending from the first end of that send fiber 220 and a portion of each receive fiber 230 extending from the first end of that receive fiber 230. In this example embodiment, as best shown in FIGS. 1 and 3A, the portions of the send fibers 220 and the portions of the receive fibers 230 held by the fiber holder 240 are arranged adjacent to one another in an alternating manner such that the longitudinal axes of the portions of the send fibers 220 and the longitudinal axes of the portions of the receive fibers 230 disposed within the housing 210 are substantially coplanar and substantially parallel to one another.

The collimator 250 is at least partially disposed within the housing 210 adjacent to and spaced apart from the first ends of the send fibers 220 and the first ends of the receive fibers 230. In this example embodiment, the position of the collimator 250 relative to the send fibers 220 and the receive fibers 230 and, more specifically, the distance between (a) the first ends of the send fibers 220 and the first ends of the receive fibers 230 and (b) the collimator 250, is optimized to maximize the amount of light received by the receive fibers 230. It should be appreciated that the position of the collimator relative to the send and receive fibers may be different when the clearance detection system includes a different collimator.

The light source 260 is connected to the second end of each send fiber 220 such that each send fiber 220 is configured to transmit light received from the light source 260 at the second end of that send fiber 220 through that send fiber 220 and to the first end of that send fiber 220.

The photodetector 270 is connected to the second end of each receive fiber 230 such that each receive fiber 230 is configured to transmit light received at the first end of that receive fiber 230 through that receive fiber 230 and to the photodetector 270 at the second end of that receive fiber 230. The photodetector 270 is sensitive to—i.e., is configured to detect—light of a designated wavelength, and is configured to generate an oscillatory signal (such as a voltage signal) based on the detected light of the designated wavelength. Thus, in this example embodiment, when the photodetector 270 receives light having a variety of different wavelengths from the receive fibers 230, the photodetector 270 detects light of the designated wavelengths received from the receive fibers 230—not light of any non-designated wavelength received from the receive fibers 230—and and generates the oscillatory signal based on the detected light of the designated wavelength.

The processor 300 is connected (such as by a wired or a wireless connection) to the photodetector 270 such that the processor can receive a signal transmitted from the photodetector 270.

In this example embodiment, the housing is made of stainless steel, though it should be appreciated that the housing may be made of any other suitably rigid material. The housing may take any suitable shape and have any suitable size.

In this example embodiment, the fiber holder is made of stainless steel, though it should be appreciated that the fiber holder may be made of any other suitably rigid material. The fiber holder may take any suitable shape and have any suitable size.

The send and receive fibers may be any suitable optical fibers such as, but not limited to: optical fibers having silica cores, silica clad optical fibers, optical fibers having polymer coatings, optical fibers having sapphire cores, optical fibers having gold coatings, or optical fibers having aluminum coatings. The send and receive fibers may take any suitable shape and have any suitable size.

In this example embodiment, the collimator is a spherical lens made of sapphire, though it should be appreciated the collimator may be any other suitable transparent lensing element configured to converge light beams. The collimator may take any suitable shape (such as a plano-convex shape or a double-convex shape) and have any suitable size.

In this example embodiment, the light source is a coaxially-packaged, vbg-stabilized, single-emitter, laser-emitting 685 nm wavelength red laser, though it should be appreciated that the light source may be any other suitable light source having a designated wavelength that the photodetector is sensitive to (i.e., is configured to detect).

In this example embodiment, the photodetector is a photodiode, though it should be appreciated that the photodetector may be any other suitable photodetector configured to convert incident light into an oscillating signal (such as a voltage signal) and that is sensitive to the designated wavelength of the light emitted by the light source.

The processor may be any suitable processing device or set of processing devices, such as a microprocessor, a microcontroller-based platform, a suitable integrated circuit, one or more application-specific integrated circuits (ASICs), or one or more field programmable gate arrays (FPGAs).

Operation

In this example embodiment, the clearance detection system 100 is used to determine the distance $D_{TC}$ between a target 400a, which is a tip of a rotor blade 400 of a turbine rotor that rotates within a casing 410, and an inner wall 410a of the casing 410 (though it should be appreciated that the clearance detection system of the present disclosure may be used in conjunction with any suitable target). Specifically, the clearance detection system 100 determines the distance $D_{TC}$ between the target 400a and the inner wall 410a of the casing 410 by: (1) receiving a measured distance $D_{CH}$ between the inner wall 410a of the casing 410 and a reference location on the fiber optic sensor 200, which in this example embodiment is a surface 210a of the housing 210 of the fiber optic sensor 200; (2) determining the distance $D_{TH}$ between the target 400a and the surface 210a of the housing 210 of the fiber optic sensor 200; and (3) subtracting $D_{CH}$ from $D_{TH}$ to determine $D_{TC}$.

The housing 210 of the fiber optic sensor 200 is inserted into and secured within an opening in the casing 410 such that the surface 210a of the housing 210 is recessed a distance $D_{CH}$ from the inner wall 410a of the casing 410a. It should be appreciated that the radial position of the opening in the casing 410 within which the fiber optic sensor 200 is inserted and secured is determined such that the range of expected $D_{TC}$ fall within the working, calibrated range of the fiber optic sensor 200. The distance $D_{CH}$ is determined by the axial location of the target 400a such that the target 400a will not contact the collimator 250 during operation.

In operation, the light source 260 is activated while the target 400a rotates within the casing 410. Once the light source 260 is activated, the light source 260 emits light of the designated wavelength, and each send fiber 220 transmits light of the designated wavelength received from the light source 260 at the second end of that send fiber 220 through that send fiber 220 and to the first end of that send fiber 220. Each send fiber 220 emits a light beam 225 of the designated wavelength from its first end. Specifically, and as best shown in FIGS. 1 and 2, in this example embodiment the send fiber 220a emits a light beam 225a, the send fiber 220b emits a light beam 225b, the send fiber 220c emits a light beam 225c, the send fiber 220d emits a light beam 225d, and the send fiber 220e emits a light beam 225e.

The light beams 225 emitted from the first ends of the send fibers 220 travel to the collimator 250. Before reaching the collimator 250, the longitudinal axes of the light beams 225 are substantially parallel to one another. The collimator 250 diverts the light beams 225 such that, after traveling through the collimator 250, the longitudinal axes of the light beams 225 diverge from one another such that the longitudinal axes of the light beams 225 are not parallel and extend from the collimator 250 in different directions. The send fibers 220, the receive fibers 230, and the collimator 250 are thus arranged relative to one another such that, when the light source 260 is activated, a light field including a plurality of diverging light beams 225 of the designated wavelength is projected into the target area through which the target 400a traverses.

Put differently, in this example embodiment, the projected light field includes multiple alternating and diverging regions that are illuminated by light of the designated wavelength emitted from the light source 260 and not illuminated by light of the designated wavelength emitted from the light source 260. The regions illuminated by light of the designated wavelength emitted from the light source are referred to herein as "illuminated regions" and the regions not illuminated by light of the designated wavelength emitted from the light source are referred to herein as "non-illuminated regions" for brevity. It should be appreciated that, in certain instances, the non-illuminated regions of the light field (i.e., the regions of the light field that are not illuminated by light of the designated wavelength emitted from the light source) may be at least partially illuminated by ambient light having a wavelength other than the designated wavelength. Such ambient light does not affect the operation of the clearance detection system of the present disclosure because the photodetector is not sensitive to the non-designated wavelength(s) of this ambient light.

Figure 4A:
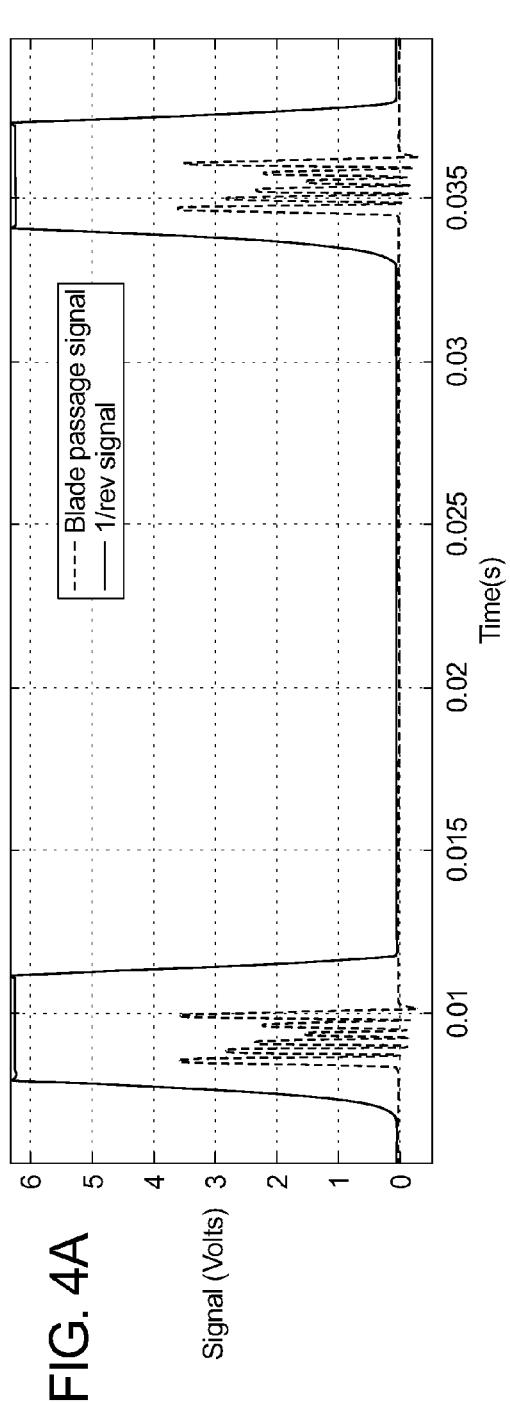
FIG. 4A is a graph of voltage versus time for a first instance and a second instance of the target traversing through the light field.
Figure 4B:
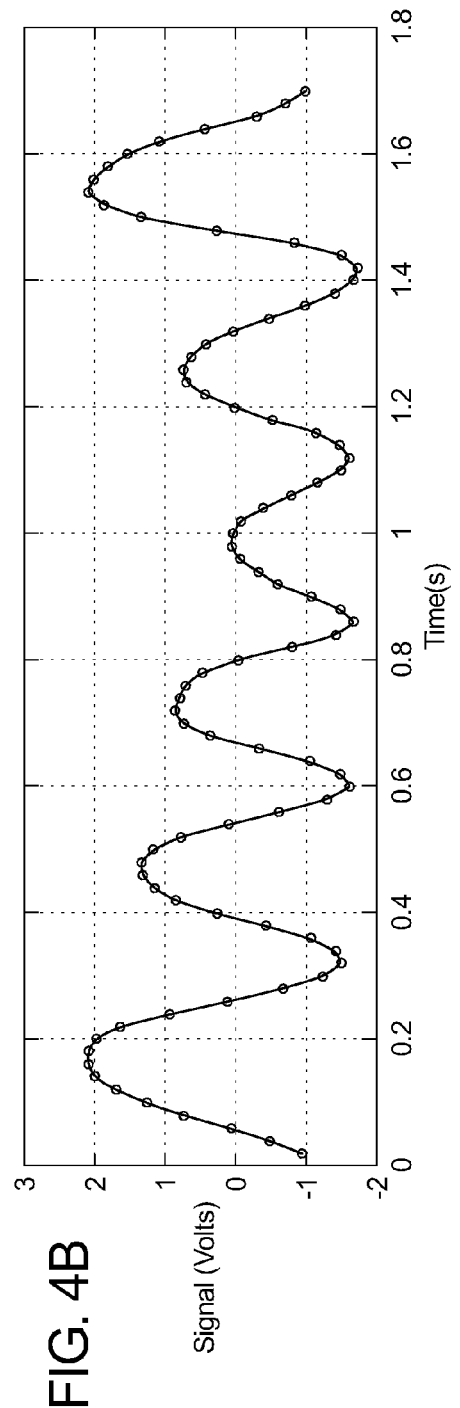
FIG. 4B is a graph of voltage versus time for the first instance of the target traversing through the light field shown in FIG. 4A.

As the target 400a traverses through the light field (and, particularly, through the multiple alternating and diverging illuminated and non-illuminated regions), the target 400a reflects light of the designated wavelength back toward the collimator 250. The collimator 250 collimates the reflected light, and each of one or more of the receive fibers 230 transmits the collimated reflected light received at the first end of that receive fiber 230 through that receive fiber 230 and to the photodetector 270 at the second end of that receive fiber 230. When the photodetector 270 receives the reflected light from the receive fibers 230, the photodetector 270 detects light of the designated wavelength received from the receive fibers 230 and generates a signal based on the detected reflected light of the designated wavelength. In this example embodiment, the signal is a voltage signal. FIG. 4A is a graph of voltage versus time for a first instance and a second instance of the target 400a traversing through the light field. FIG. 4B is a graph of voltage versus time for the first instance of the target 400a traversing through the light field. After generating the voltage signal, the photodetector 270 transmits the voltage signal to the processor 300 in a suitable manner.

The voltage signal has an oscillatory component that corresponds to the frequency at which the target 400a encounters the multiple alternating and diverging illuminated and non-illuminated regions of the light field. Because the multiple alternating illuminated and non-illuminated regions of the light field diverge from one another, an inverse relationship exists between the frequency content of the voltage signal and the distance $D_{TH}$ between the target 400a and the surface 210a of the fiber optic sensor 200 (assuming a constant transverse velocity of the target 400a across the light field). Specifically, the higher the dominant frequency of the voltage signal for a particular instance of the target 400a traversing through the light field, the smaller the distance $D_{TH}$ between the target 400a and the surface 210a of the fiber optic sensor 200, and the lower the dominant frequency of the voltage signal for a particular instance of the target 400a traversing through the light field, the greater the distance $D_{TH}$ between the target 400a and the surface 210a of the fiber optic sensor 200. The processor 300 is configured to use this inverse relationship along with the voltage signal and the transverse velocity of the target 400a as the target 400a moves through the light field to determine the distance $D_{TH}$ between the target 400a and the surface 210a of the fiber optic sensor 200 (and, in turn, the distance $D_{TC}$ between the target 400a and the inner wall 410a of the casing 410).

Figure 5:
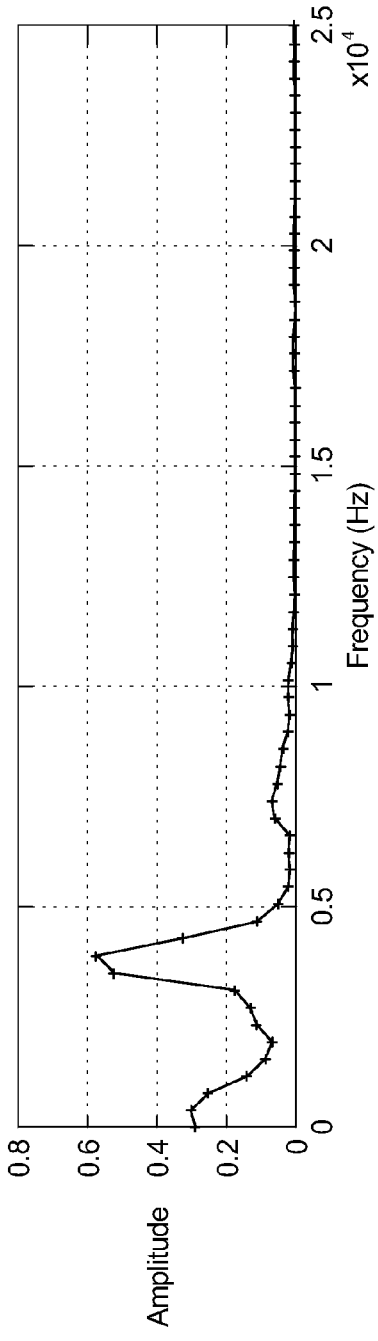
FIG. 5 is a graph of the characteristic frequencies of the voltage signal shown in FIG. 4B.

Specifically, after receiving the voltage signal in this example embodiment, the processor 300 uses a Fast Fourier Transform to resolve a portion of the voltage signal corresponding to an instance of the target 400a traversing through the light field into that portion of the voltage signal's characteristic frequencies. The processor 300 then determines the dominant frequency, which is the frequency at which the target 400a encountered the multiple alternating and diverging illuminated and non-illuminated regions of the projected light field during this particular instance of the target 400a traversing through the light field. FIG. 5 is a graph of the characteristic frequencies of the voltage signal shown in FIG. 4B, which corresponds to the first instance of the target 400 traversing through the light field, generated by performing a Fast Fourier Transform on the voltage signal in FIG. 4B. The dominant frequency for this instance of the target 400a traversing through the light field (i.e., the frequency corresponding to the highest amplitude) is 3906 Hz.

After determining the dominant frequency, the processor 300 non-dimensionalizes the dominant frequency using the transverse velocity of the target 400a during this instance of the target 400a traversing through the light field. In this embodiment, the transverse velocity of the target 400a is independently calculated by: (1) acquiring an analog signal generated by a sensor (such as an optical probe, an active or passive eddy current probe, and the like) based on the rotation of the turbine shaft; and (2) multiplying the angular velocity of the turbine shaft by the radius of the rotor blade 400, though it should be appreciated that the transverse velocity of the target may be determined in any suitable manner. The processor 300 uses the non-dimensionalized frequency to determine the distance $D_{TH}$ between the target 400a and the surface 210a of the fiber-optic sensor 200 based on a predetermined linear relationship between the non-dimensionalized frequency and the distance $D_{TH}$. Equation (1), included below, represents the linear relationship in this example embodiment.

$$\text{Non-dimensionalized frequency} = -0.07 * D_{TH}(\text{in mils}) + 170 \quad (1)$$

Using this linear relationship, the processor 300 determines the distance $D_{TH}$ between the target 400a and the surface 210a of the housing 210 of the fiber optic sensor 200 using Equation (2), included below.

$$D_{TH}(\text{in mils}) = -\left(\frac{\text{Non-dimensionalized frequency} - 170}{0.07}\right) \quad (2)$$

After determining the distance $D_{TH}$, the processor 300 determines the distance $D_{TC}$ between the target 400a and the inner wall 410a of the casing 410 using Equation (3), included below.

$$D_{TC} = D_{TH} - D_{CH} \quad (3)$$

In certain embodiments, the distance $D_{CH}$ between the inner wall 410a of the casing 410 and the surface 210a of the housing 210 of the fiber optic sensor 200 is measured by a user, and the clearance detection system 100 receives the distance $D_{CH}$ via a suitable input device of the clearance detection system 100 (not shown) and stores the distance $D_{CH}$ in a suitable memory device of the clearance detection system 100 (not shown). The processor may retrieve the stored distance $D_{CH}$ when determining the distance $D_{TC}$.

Figure 6:
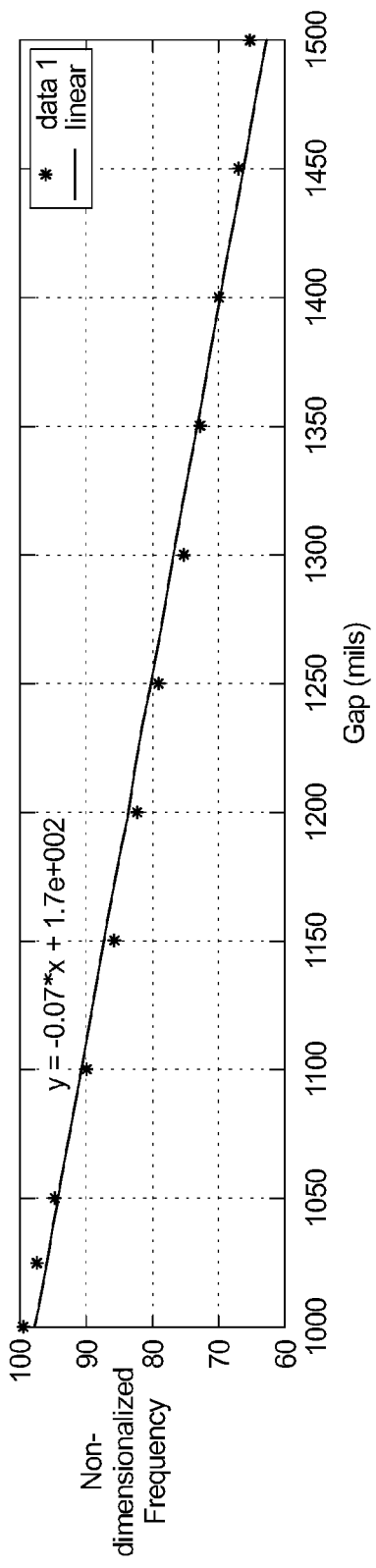
FIG. 6 a graph of distance versus non-dimensionalized frequency, and shows various data points representing pairs of known distances and corresponding determined non-dimensionalized frequencies and the resulting linear relationship determined using those data points.

In one embodiment, the linear relationship between the non-dimensionalized frequency and the distance is determined by determining non-dimensionalized frequencies corresponding to known distances between the target and the fiber-optic sensor. More specifically, to determine the linear relationship in this embodiment, the target is traversed through the light field at a known transverse velocity for a plurality of different known distances between the fiber-optic sensor and the target. For each instance of the target traversing through the light field, the system generates a voltage signal and determines the dominant frequency of that voltage signal. The system non-dimensionalizes each dominant frequency using the corresponding known transverse velocity of the target. The system then uses the known distances between the fiber-optic sensor and the target and the corresponding determined non-dimensionalized frequencies to determine the linear relationship between the sets of known distances and corresponding determined non-dimensionalized frequencies. FIG. 6 is a graph of distance versus non-dimensionalized frequency, and shows various data points representing pairs of known distances and corresponding determined non-dimensionalized frequencies and the resulting linear relationship determined using those data points.

Variations

The fiber optic sensor may include any suitable quantity of send fibers and any suitable quantity of receive fibers.

The send fibers and the receive fibers may be arranged in any suitable manner as long as the projected light field includes at least three alternating and diverging illuminated and non-illuminated regions (i.e., at least two diverging illuminated regions separated by a non-illuminated region). It should be appreciated, however, that the use of more alternating and diverging illuminated and non-illuminated regions results in a more accurate determination of the distance between the target and the fiber-optic sensor. Particularly, more alternating and diverging illuminated and non-illuminated regions results in a more robust voltage signal, which in turn enables more accurate determination of the dominant frequency of that voltage signal, which in turn enables more accurate determination of the distance between the target and the fiber-optic sensor.

The arrangement of the send and receive fibers shown in FIGS. 1 and 3A is one example arrangement, and the present disclosure contemplates a variety of other suitable arrangements of the send and receive fibers that create a light field including multiple alternating and diverging illuminated and non-illuminated regions. Two example alternative send and receive fiber arrangements are shown in FIGS. 3B and 3C.

In certain embodiments, the fiber-optic sensor may be used as a redundant timing sensor in a conventional tip timing system, such as that described in U.S. Pat. No. 4,049,349.

In various embodiments, the clearance detection system of the present disclosure determines the distance between the fiber-optic sensor and the target in the manner described in "Time-Of-Flight Tip-Clearance Measurements," authored by H. S. Dhawal, A. P. Kurkov, and D. C. Janetzke and published in the 35th AIAA/ASME/SAE/ASEE Joint Propulsion Conference and Exhibit, Jun. 20-24, 1999. Generally, in these embodiments, for each pair of diverging illuminated regions in the light field separated by a non-illuminated region, the system determines the time it takes the target to traverse the distance between those two diverging light regions. Assuming the light field includes N light regions, the system makes $_NC_2$ of these determinations. These periods of time can be used to determine the distance between the fiber-optic sensor and the target. In one such embodiment, if multiple determinations are made and multiple corresponding distances are determines, the system averages those distances.

In certain embodiments the fiber-optic sensor includes one or more cooling tubes (such as within the housing) configured to cool certain components of the fiber-optic sensor during operation, such as via circulation of a suitable coolant through the cooling tubes.

The fiber-optic sensor may be attached to the casing in any suitable manner. In one embodiment, the housing of the fiber-optic sensor and the opening in the casing are threaded, which enables the fiber-optic sensor to be screwed into the casing. In another embodiment, the fiber-optic sensor is press-fit into the opening in the casing. In another embodiments, the fiber-optic sensor is attached to the casing using a suitable fastener or fasteners, such as screws. In another embodiment, the fiber-optic sensor is attached to the casing via an adhesive.

The present disclosure also contemplates a rotor casing having the fiber-optic sensor of the present disclosure attached thereto. In one particular example, the present disclosure contemplates a turbine including a turbine casing having the fiber-optic sensor of the present disclosure attached thereto.

It should be appreciated that the embodiment of the clearance detection system illustrated in the accompanying Figures is but one example configuration of components and sizes and shapes of such components. Other embodiments of the clearance detection system may employ different configurations of components and/or components of different sizes or shapes.

The present disclosure contemplates the use of a reference location on the fiber optic sensor that is different than the particular surface of the fiber optic sensor described above with respect to FIG. 1.

In various embodiments, once the processor determines the distance between the target and the casing, the processor causes a display of the determined distance $D_{TC}$, such as by causing a display device to display the determined distance $D_{TC}$ and/or causing a printer to print the determined distance $D_{TC}$. In other embodiments, the process causes a message indicating the determined distance $D_{TC}$, such as an email message or a text message indicating the determined distance $D_{TC}$, to be sent.

In certain embodiments, if the determined distance $D_{TC}$ is greater than a first predetermined threshold, the processor causes an alert to be sent or displayed indicating that the determined distance $D_{TC}$ has exceeded the first predetermined threshold. In other embodiments, if the determined distance $D_{TC}$ is less than a second predetermined threshold, the processor causes an alert to be sent or displayed indicating that the determined distance $D_{TC}$ has fallen below the second predetermined threshold.

In certain embodiments, the processor automatically causes one or more first remedial processes to be performed if the determined distance $D_{TC}$ exceeds the first predetermined threshold. In other embodiments, the processor automatically causes one or more second remedial processes to be performed if the determined distance $D_{TC}$ falls below the second predetermined threshold. For instance, in one example embodiment, when the determined distance $D_{TC}$ falls below the second predetermined threshold (e.g., when the distance between the target and the inner wall of the casing is too small), the processor automatically initiates a cooling process to cool the target, which causes the target to shrink and increases the distance $D_{TC}$ between the target and the inner wall of the casing. In another example embodiment, when the determined distance $D_{TC}$ falls below the second predetermined threshold (e.g., when the distance between the target and the inner wall of the casing is too small), the processor automatically stops the target from rotating.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A clearance detection system comprising:
   a fiber optic sensor including:
   (a) a housing;
   (b) a plurality of send fibers each configured to transmit light and each at least partially disposed within the housing;
   (c) a plurality of receive fibers each configured to transmit light and each at least partially disposed within the housing;
   (d) a collimator disposed within the housing adjacent to the plurality of send fibers and the plurality of receive fibers;
   (e) a light source connected to the plurality of send fibers, wherein when the light source is activated, light from the light source is transmitted through and emitted from each send fiber, which causes a light field to be projected, the light field including a plurality of diverging regions illuminated by light from the light source; and
   (f) a photodetector connected to the plurality of receive fibers and configured to, when the light source is activated: (i) receive, from the plurality of receive fibers, light reflected off of a target traversing through the light field; (ii) generate a signal based on the received reflected light, the signal including an oscillatory component; and (iii) transmit the signal; and
   a processor configured to: (i) receive the signal from the photodetector, (ii) determine a dominant frequency of the received signal, and (iii) determine a distance between the target and a reference location on the fiber optic sensor based at least in part on the determined dominant frequency of the received signal.

2. The clearance detection system of claim 1, wherein the collimator includes a spherical lens.

3. The clearance detection system of claim 1, wherein the photodetector includes a photodiode and the generated signal is a voltage signal.

4. The clearance detection system of claim 1, wherein portions of the send fibers and portions of the receive fibers disposed within the housing are adjacently arranged.

5. The clearance detection system of claim 4, wherein longitudinal axes of the portions of the send fibers and the portions of the receive fibers disposed within the housing are parallel.

6. The clearance detection system of claim 5, wherein the longitudinal axes of the portions of the send fibers and the portions of the receive fibers disposed within the housing are coplanar.

7. The clearance detection system of claim 4, wherein the portions of the send fibers and the portions of the receive fibers disposed within the housing are adjacently arranged in an alternating manner.

8. The clearance detection system of claim 1, wherein the collimator is spaced apart from the plurality of send fibers and the plurality of receive fibers.

9. The clearance detection system of claim 1, which includes a plurality of cooling tubes disposed within the housing and configured to cool the fibers and the collimator.

10. A fiber-optic sensor comprising:
a housing;
a plurality of send fibers each configured to transmit light and each at least partially disposed within the housing;
a plurality of receive fibers each configured to transmit light and each at least partially disposed within the housing;
a collimator disposed within the housing adjacent to the plurality of send fibers and the plurality of receive fibers;
a light source connected to the plurality of send fibers, wherein when the light source is activated, light from the light source is transmitted through and emitted from each send fiber, which causes a light field to be projected, the light field including at least three regions illuminated by light from the light source separated by at least two regions not illuminated by light from the light source; and
a photodetector connected to the plurality of receive fibers and configured to, when the light source is activated: (i) receive, from the plurality of receive fibers, light reflected off of a target traversing through the light field; (ii) generate a signal based on the received reflected light, the signal including an oscillatory component; and (iii) transmit the signal.

11. The fiber-optic sensor of claim 10, wherein the photodetector is configured to transmit the signal to a processor to enable the processor to determine a dominant frequency of the received signal and determine a distance between the target and a reference location on the fiber optic sensor based at least in part on the determined dominant frequency of the received signal.

12. The fiber-optic sensor of claim 10, wherein the collimator includes a spherical lens.

13. The fiber-optic sensor of claim 10, wherein the photodetector includes a photodiode and the generated signal is a voltage signal.

14. The fiber-optic sensor of claim 10, wherein portions of the send fibers and portions of the receive fibers disposed within the housing are adjacently arranged.

15. The fiber-optic sensor of claim 14, wherein longitudinal axes of the portions of the send fibers and the portions of the receive fibers disposed within the housing are parallel.

16. The fiber-optic sensor of claim 15, wherein the longitudinal axes of the portions of the send fibers and the portions of the receive fibers disposed within the housing are coplanar.

17. The fiber-optic sensor of claim 14, wherein the portions of the send fibers and the portions of the receive fibers disposed within the housing are adjacently arranged in an alternating manner.

18. A clearance detection method comprising:
activating a light source of a fiber optic sensor to cause a light field to be projected, the light field including a plurality of diverging regions illuminated by light from the light source;
receiving, at a photodetector of the fiber optic sensor, light reflected off of a target traversing through the light field;
generating, by the photodetector, a signal based on the received reflected light, the signal including an oscillatory component;
transmitting the signal to a processor;
receiving, at the processor, the signal from the photodetector;
determining, by the processor, a dominant frequency of the received signal; and
determining, by the processor, a distance of the target from a reference location on the fiber optic sensor based at least in part of the determined dominant frequency of the received signal.

19. The clearance detection method of claim 18, wherein the photodetector includes a photodiode.

20. The clearance detection method of claim 19, wherein the generated signal is a voltage signal.

* * * * *